United States Patent
Bates

(10) Patent No.: US 8,073,922 B2
(45) Date of Patent: Dec. 6, 2011

(54) SYSTEM AND METHOD FOR REMOTE ASYNCHRONOUS DATA REPLICATION

(75) Inventor: John W. Bates, Mendon, MA (US)

(73) Assignee: Twinstrata, Inc, Natick, MA (US)

( * ) Notice: Subject to any disclaimer, the term of this patent is extended or adjusted under 35 U.S.C. 154(b) by 311 days.

(21) Appl. No.: 12/177,976

(22) Filed: Jul. 23, 2008

(65) Prior Publication Data

US 2009/0030986 A1  Jan. 29, 2009

Related U.S. Application Data

(60) Provisional application No. 60/952,538, filed on Jul. 27, 2007.

(51) Int. Cl.
*G06F 15/16* (2006.01)

(52) U.S. Cl. ........ 709/208; 709/201; 709/205; 709/224; 709/236; 707/100; 707/202

(58) Field of Classification Search ............... 709/205, 709/208, 236, 201, 224; 707/100, 202
See application file for complete search history.

(56) References Cited

U.S. PATENT DOCUMENTS

| | | | |
|---|---|---|---|
| 5,806,075 A | 9/1998 | Jain et al. | |
| 6,148,339 A * | 11/2000 | Nagamatsu et al. | 709/224 |
| 6,182,086 B1 * | 1/2001 | Lomet et al. | 1/1 |
| 7,043,485 B2 | 5/2006 | Manley et al. | |
| 7,143,122 B2 | 11/2006 | Burton et al. | |
| 7,203,807 B2 | 4/2007 | Urabe et al. | |
| 7,225,204 B2 | 5/2007 | Manley et al. | |
| 7,340,490 B2 | 3/2008 | Teloh et al. | |
| 7,356,550 B1 | 4/2008 | Lin et al. | |
| 7,617,369 B1 * | 11/2009 | Bezbaruah et al. | 711/162 |
| 2003/0145020 A1 | 7/2003 | Ngo et al. | |
| 2004/0193625 A1 * | 9/2004 | Sutoh et al. | 707/100 |
| 2005/0055382 A1 | 3/2005 | Ferrat et al. | |
| 2005/0193037 A1 | 9/2005 | Adiba et al. | |
| 2005/0273654 A1 * | 12/2005 | Chen et al. | 714/13 |
| 2006/0182050 A1 | 8/2006 | Dohm | |
| 2007/0162516 A1 * | 7/2007 | Thiel et al. | 707/201 |
| 2008/0114816 A1 | 5/2008 | Shepherd | |
| 2008/0126300 A1 | 5/2008 | Boss et al. | |
| 2008/0133467 A1 | 6/2008 | Davis et al. | |

* cited by examiner

*Primary Examiner* — Wing Chan
*Assistant Examiner* — Benjamin M Thieu
(74) *Attorney, Agent, or Firm* — AKC Patents LLC; Aliki K. Collins

(57) ABSTRACT

An asynchronous peer-to-peer data replication method implemented within a replication cluster comprising at least one master node and at least a first client node includes entering an update in a data volume of the master node and storing the update in a master node storage. Next, updating a first active session in a master log and then sending a first message from the master node to the first client node. The first message comprises a first message content and first "piggy-backed" data indicating that the first active session in the master log was updated. Next, receiving the first message by the first client node, registering that the first active session in the master log was updated and signaling internally that the first active session in the master log was updated. Next, sending an update request from the first client node to the master node, processing the update request by the master node and sending the update to the first client node. Finally, receiving the update by the first client node and updating the first active session in a first client log.

25 Claims, 16 Drawing Sheets

SYSTEM AND METHOD FOR REMOTE ASYNCHRONOUS DATA REPLICATION

CROSS REFERENCE TO RELATED CO-PENDING APPLICATIONS

This application claims the benefit of U.S. provisional application Ser. No. 60/952,538 filed on Jul. 27, 2007 and entitled REMOTE ASYNCHRONOUS PEER TO PEER REPLICATION which is commonly assigned and the contents of which are expressly incorporated herein by reference.

FIELD OF THE INVENTION

The present invention relates to a system and a method for remote data replication, and more particularly to remote asynchronous peer-to-peer data replication.

BACKGROUND OF THE INVENTION

With the rise of the computer age and the ubiquity of the digital mass storage system, more and more of the most valuable data in our everyday lives have been entrusted to relatively fragile magnetic media. Everything from our credit card transactions and medical records to our music collections and photographs are being stored on disks. While it may not be as easy to assign a monetary cost to a one-of-a-kind photograph of a child as it is to a bank deposit, it is assured that a parent will keenly feel its loss.

The increased density of information stored in digital formats increases the risks of loss. Whether the data is stored in an enterprise or in a home, minor accidents like a power surge, the activation of a sprinkler system due to a small fire, or a moment's theft can result in a tremendous loss. One solution to this problem is data backup. Data backup involves transferring an amount of data, usually accumulated over a day or a week, to an offline magnetic storage medium and then moving the storage medium offsite where it is stored. This practice of backing up data to more durable, offline media mitigates some of the risk of loss, but requires a rigorous adherence to a schedule, and does not prevent the loss or damage to data stored between backup events.

Backup alone also does not suffice to protect data against common problems. Minor accidents have a tendency to become major as small fires spread, rainstorms become floods, and power surges become power outages. Quickly recovering access and restoring availability of data in the light of larger incidents require a degree of geographic separation between copies of data. While physically moving a backup off-site serves to mitigate some of the risk of data loss, restoring access to such remotely stored data is a tedious, error-prone process and frequently leads to a significant down time for the business operations.

A better approach to data recovery is the practice of automatically updating a remote replica of a computer storage system. This practice is called remote replication (often just replication). Backup is different from replication, since it saves a copy of data unchanged for a long period of time, whereas replication involves frequent data updates and quick recovery. Enterprises commonly use remote replication as a central part of their disaster recovery or business continuity planning.

Remote replication may be synchronous or asynchronous. A synchronous remote replication system maintains multiple identical copies of a data storage component in multiple locations, with the requirement that a host application does not receive acknowledgment of a successful change until the same change has been applied to all replicas. This requirement ensures that the data are always the same at all locations, and a failure at one site will not result in any lost data. However, this level of reliability comes at a high cost. The performance penalties of transmitting the data are paid at every update and the network hardware required is often prohibitively expensive. Furthermore, the costs increase dramatically as the distance between the sites increases.

Asynchronous remote replication systems relax the above mentioned requirement, allowing the remote updates to occur at some point after the host application has received the acknowledgments. There are a wide variety of approaches that are used in asynchronous replication, but they typically involve the local system maintaining some sort of log of updates, which is transmitted and applied to the remote system. When and how this log is transmitted has significant implications for the reliability characteristics of the replication system, as the amount of data that is stored in the log is also the amount of data that will be lost if a disaster occurs at the local site.

Remote replication is a tremendously powerful tool for business continuity. It also has the potential to be just as powerful a tool for other applications, in the home and in the business. However, the cost and complexity of the current solutions have prevented widespread adoption. Synchronous remote replication has too high a cost, both in network pricing and performance penalties, while asynchronous remote replication doesn't always fare much better.

Accordingly, there is a need for a remote replication solution that is inexpensive, easy to use and scalable without compromising performance.

SUMMARY OF THE INVENTION

In general, in one aspect, the invention features an asynchronous data replication method implemented within a replication cluster comprising at least one master node and at least a first client node. The master node comprises a master log and the first client node comprises a first client log. The method includes entering an update in a data volume of the master node and storing the update in a master node storage. Next, updating a first active session in the master log and then sending a first message from the master node to the first client node. The first message comprises a first message content and first "piggybacked" data indicating that the first active session in the master log was updated. Next, receiving the first message by the first client node, registering that the first active session in the master log was updated and signaling internally that the first active session in the master log was updated. Next, sending an update request from the first client node to the master node, processing the update request by the master node and sending the update to the first client node. Finally, receiving the update by the first client node and updating the first active session in the first client log.

Implementations of this aspect of the invention may include one or more of the following features. The first active session comprises one or more session segments. The master log comprises a master active session matrix storing all session segments for all cluster nodes and the first client log comprises a first client active session matrix storing all session segments for all cluster nodes. Each of the session segments comprises an index and a timestamp and the session matrices display all session segments' indices and timestamps for all cluster nodes. The updating of the first active session comprises writing data in an extent structure and entering the extent structure into the first active session. The extent structure may have a length larger than a session segment's length and then the extent structure is entered into more than one session segments. The processing of the update request by the master node comprises locating in the master active session matrix all session segments that have not yet been transmitted to the first client node log and sending the identified session segments to the first client node. The session segments that have not yet been transmitted to the first client node log are identified as session segments registered in a row of the master active session matrix corresponding to the first client node having a timestamp earlier than the timestamp of a most recently updated session segment in a row of the master active session matrix corresponding to the master node. The replication cluster may include a second client node and the second client node comprises a second client log having a second client active session matrix storing all session segments for all cluster nodes. The method may further include sending a second message from the first client node to the second client node. The second message comprises a second message content and second "piggybacked" data indicating that the first active session was updated. The method further includes receiving the second message by the second client node, registering that the first active session in the master log and the first client log was updated and signaling internally that the first active session was updated. Next, sending an update request from the second client node to the first client node, processing the update request by the first client node and sending the update to the second client node, and then receiving the update by the second client node and updating the first active session in the second client log. The message may be a "health check" message sent periodically from the master node to any of the client nodes, or a "health check" message sent periodically from any of the client nodes to the master node, or a "health check" message sent periodically from any of the client nodes to other client nodes within the replication cluster. The method may further include completing the first active session in the master log and in any of the client logs. The master log further comprises an authorization and access control protocol for each cluster node. The access control protocol comprises one of read-write, read-only, and replicate-only.

In general, in another aspect, the invention features a data replication system for performing peer-to-peer data replication within a replication cluster comprising at least one master node and at least a first client node. The master node comprises a computing device, a primary storage and a session storage. The computing device comprises a data replication application configured to enter an update in a data volume of the master node and store the update in the master node primary storage, update a first active session in a master log stored in the session storage, send a first message from the master node to the first client node and upon receipt of an update request from the first client node process the update request and send the requested update to the client node. The first message comprises a first message content and first "piggybacked" data indicating that the first active session in the master log was updated. The first client node comprises a computing device, a primary storage and a session storage. The computing device of the first client node comprises a data replication application configured to receive the first message by the master node, register that the first active session in the master log was updated and signal internally in the client node that the first active session in the master log was updated, send an update request to the master node, receive the update from the master node and update the a first active session in a first client log stored in the session storage.

Among the advantages of this invention may be one or more of the following. The peer-to-peer replication solution is scalable, simplified and has reduced cost compared to prior art replication solutions. The architecture of the peer-to-peer replication system supports multiple replication sites. The bandwidth-efficient multi-way replication allows replicating data from one site to many sites without increasing the bandwidth requirements of the primary site. The multi-way replication allows tracking the replication state of multiple sites in a session log and has the ability to reconstruct an image of data without the image being complete at any one site. A tunable data replication process allows the user to configure a set of delta matrix constraints that must be satisfied before the primary site can consider a segment of data safely replicated.

The details of one or more embodiments of the invention are set forth in the accompanying drawings and description below. Other features, objects and advantages of the invention will be apparent from the following description of the preferred embodiments, the drawings and from the claims.

BRIEF DESCRIPTION OF THE DRAWINGS

Referring to the figures, wherein like numerals represent like parts throughout the several views.

DETAILED DESCRIPTION OF THE INVENTION

Figure 1:
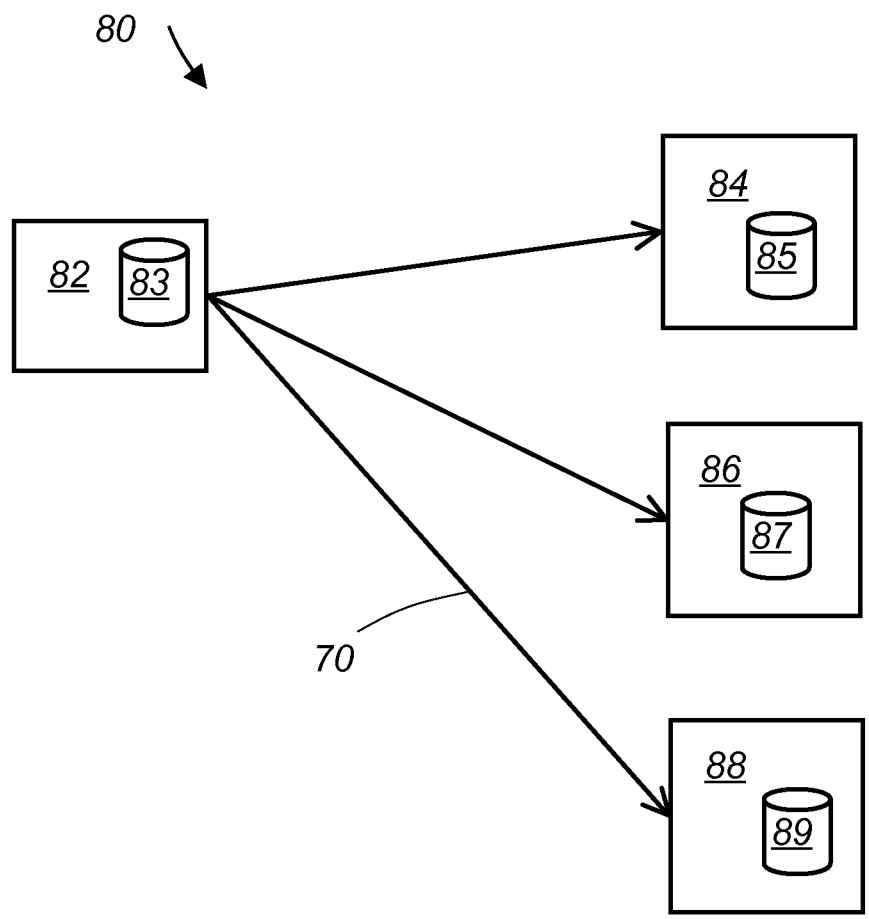
FIG. 1 is a block diagram of prior art replication system.

Referring to FIG. 1, a prior art data replication system 80 utilizes a hub and spoke type topology for replicating data stored in volume 83 located in the master node 82 onto volumes 85, 87, 89, located in the client nodes 84, 86, 88, respectively. An update in the data of volume 83 of the master node 82 is usually "pushed" down to volumes 85, 87, 89 of the client nodes 84, 86, 88, respectively, via wired or wireless network connections 70. As was mentioned above, this type of data replication is limited by the bandwidth of network 70 and is usually very slow and expensive especially for synchronous type replication.

Figure 2A:
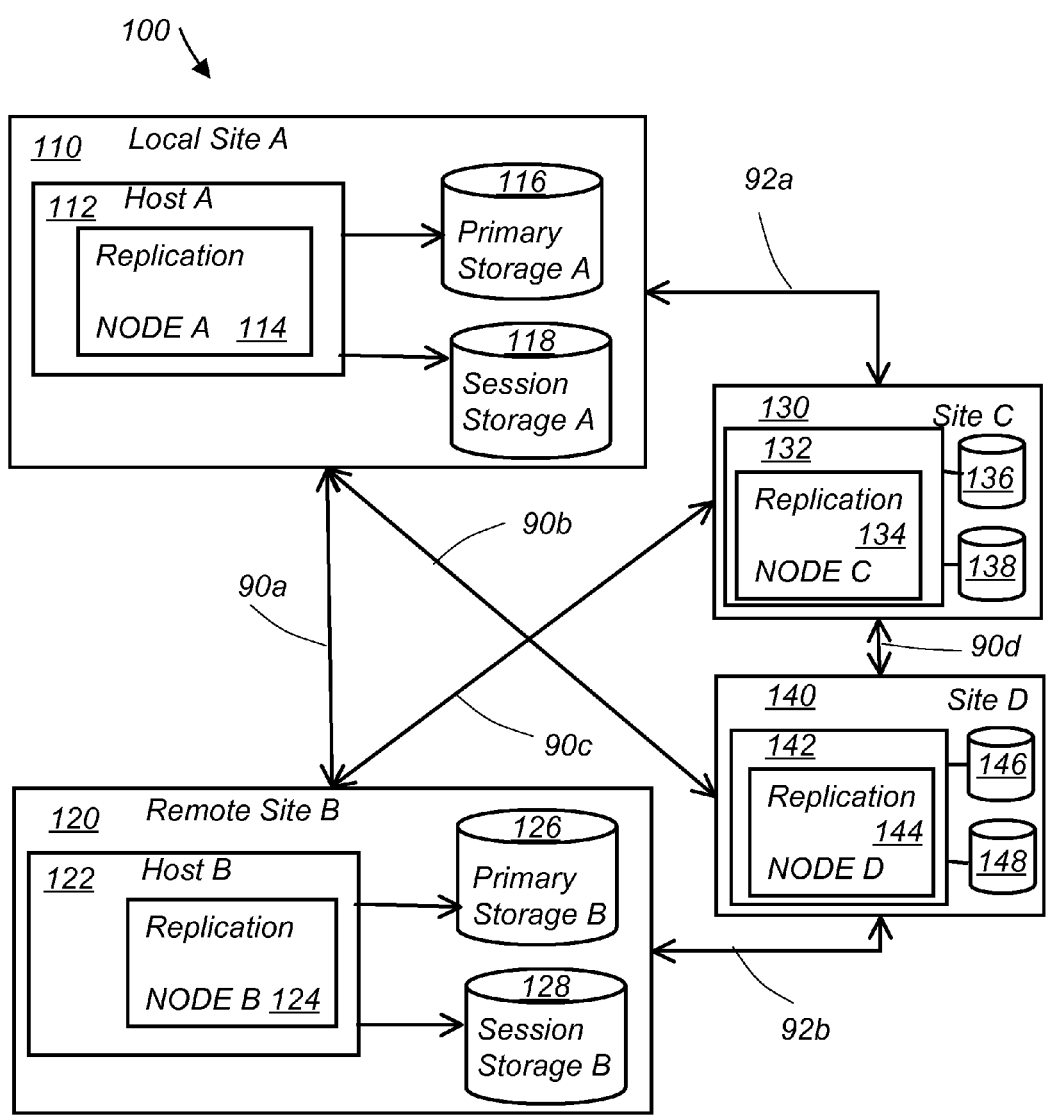
FIG. 2A is a schematic overview diagram of a peer-to-peer data replication system according to this invention.

Referring to FIG. 2A, an improved data replication system 100 according to this invention utilizes a "peer-to-peer" topology for replicating data stored in primary storage 116 of a local site A onto storage systems 126, 136, 146, located in remote site B, site C and site D, respectively. Sites C and D may be in the same location as site A or other remote locations. In a "peer-to-peer" replication topology, data are bi-directionally replicated between and among all sites of the data network. In the example of FIG. 2, data stored in primary storage A 116 are replicated onto storages 126, 136, 146, located in sites B, C, D via connections 90a, 92a and 90c, respectively. Also, data stored in storage B 126 are replicated onto storages 116, 136, 146 located in sites A, C, D via connections 90a, 90b and 92b, respectively. Also, data stored in storage C 136 are replicated onto storages 116, 126, 146 located in sites A, B, D via connections 92a, 90c and 90d, respectively. Furthermore, data stored in storage D 146 are replicated onto storages 116, 126, 136 located in sites A, B, C via connections 90c, 92b and 90d, respectively. Connections 90a-90d and 92a-92b allow for bi-directional communication between the corresponding sites and may be wired or wireless connections, including Local Area Network (LAN), Wide Area Network (WAN), Personal Area Network (PAN), the Internet, and a Wireless Wide Area Network (WWAN, among others. Each local site A, B, C, D, includes a host 112, 122, 132, 142 that supports a data replication application 114, 124, 134, 144, a local storage device 116, 126, 136, 146 and a session storage 118, 128, 138, 148, respectively. Hosts A, B, C, D may be personal computers, servers, workstations, mainframe computers, desktop computers, laptop computers, computing circuits or any combination thereof. In one example, host A 112 is a personal computer and is connected to a primary storage A 116 via a cable connected to the computer's small computer system interface (SCSI) port. Primary storage A 116 is an external storage device, such as an optical disk or a magnetic tape. Host A 112 is also connected to an internal storage device that serves as session storage A 118. In other embodiments, local sites C and D do not include a host device.

In the embodiment of FIG. 2A, cluster node A 114 is initially set to be a "master" node or "source", i.e., the node where data "updates" are initiated. In the same embodiment, cluster node B 124 is a "client" node or "target", i.e., the node that receives and copies the "updates" of the master node A. In one example, an "update" is a write/save in an extent, i.e., a contiguous area of storage in a file. The data "updates" are captured and applied to a session log by the replication application 114.

Figure 3:
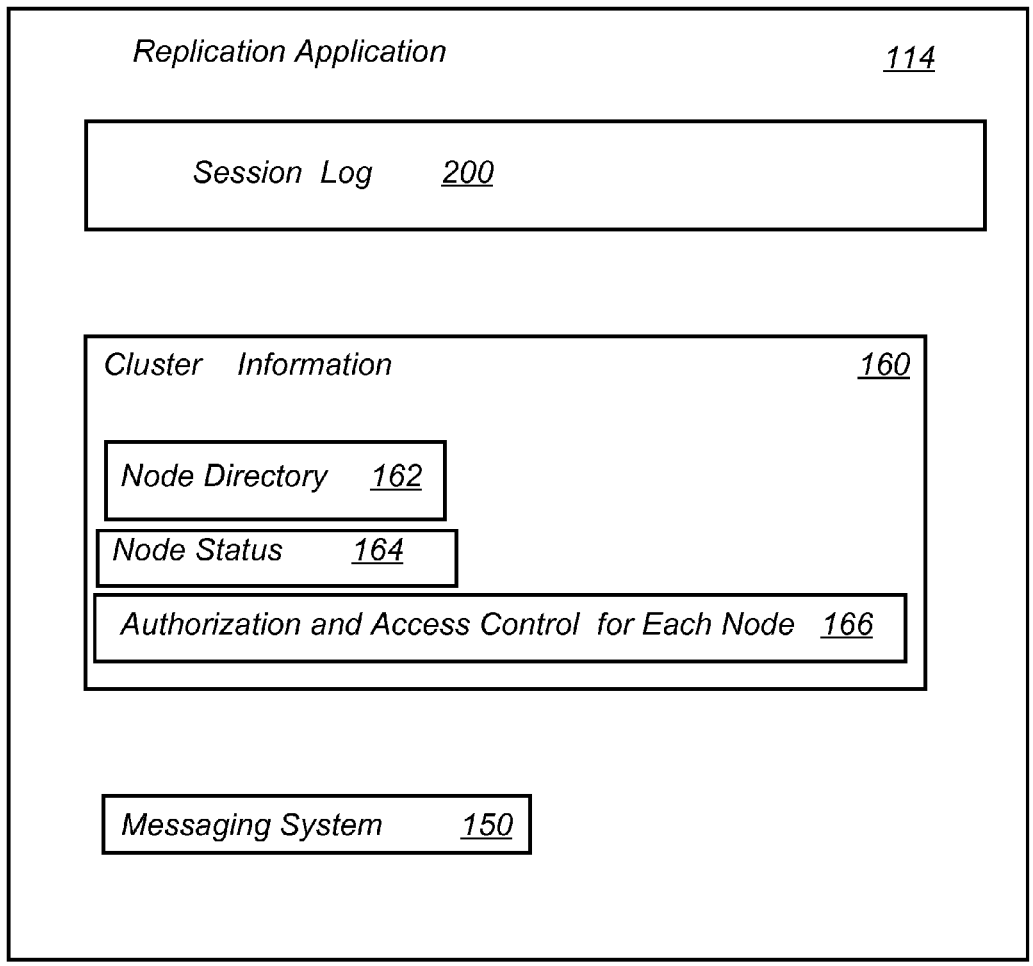
FIG. 3 is an overview block diagram of the replication application of FIG. 2A.
Figure 4:
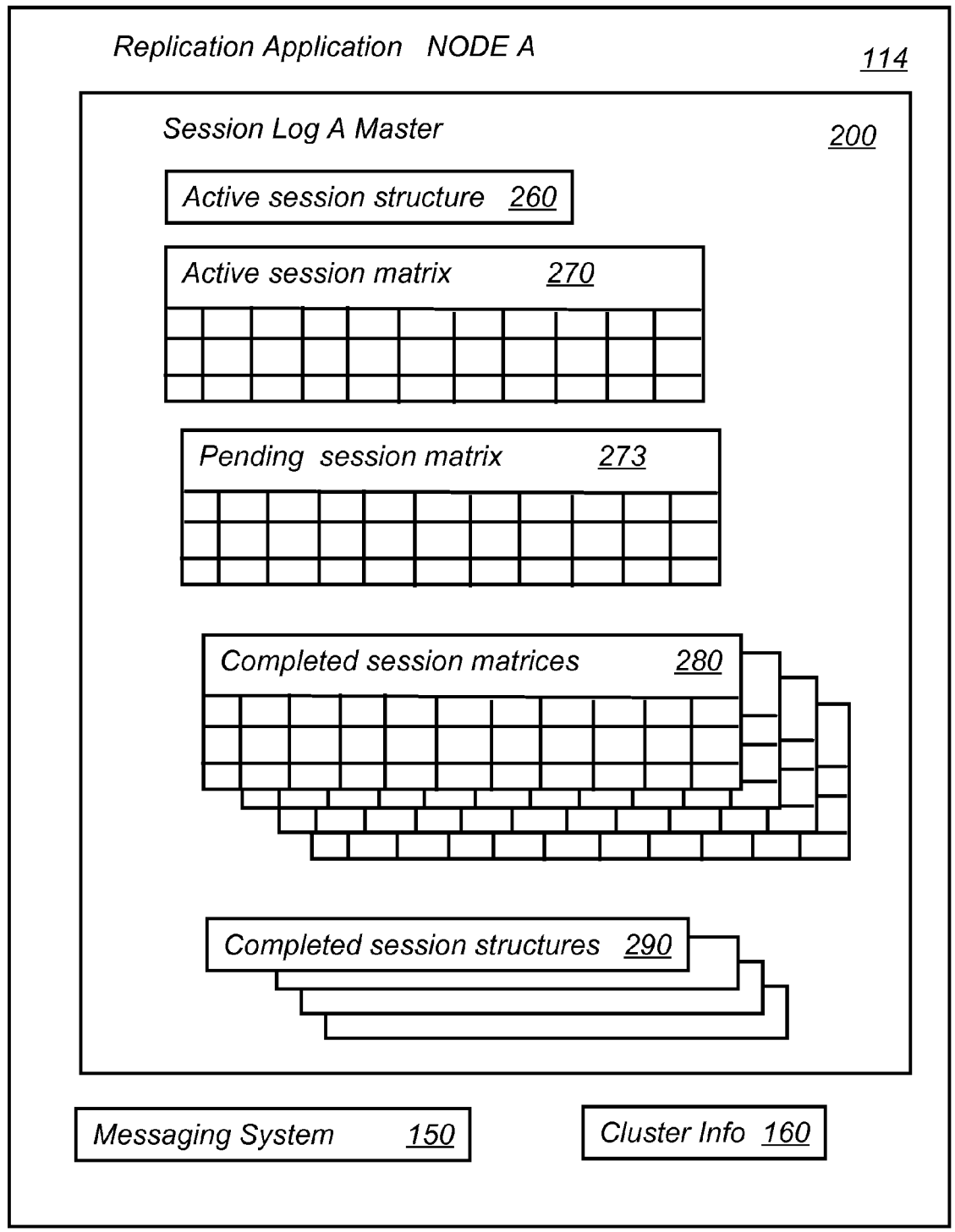
FIG. 4 is a block diagram of the session log for the master node A of FIG. 2A.
Figure 5:
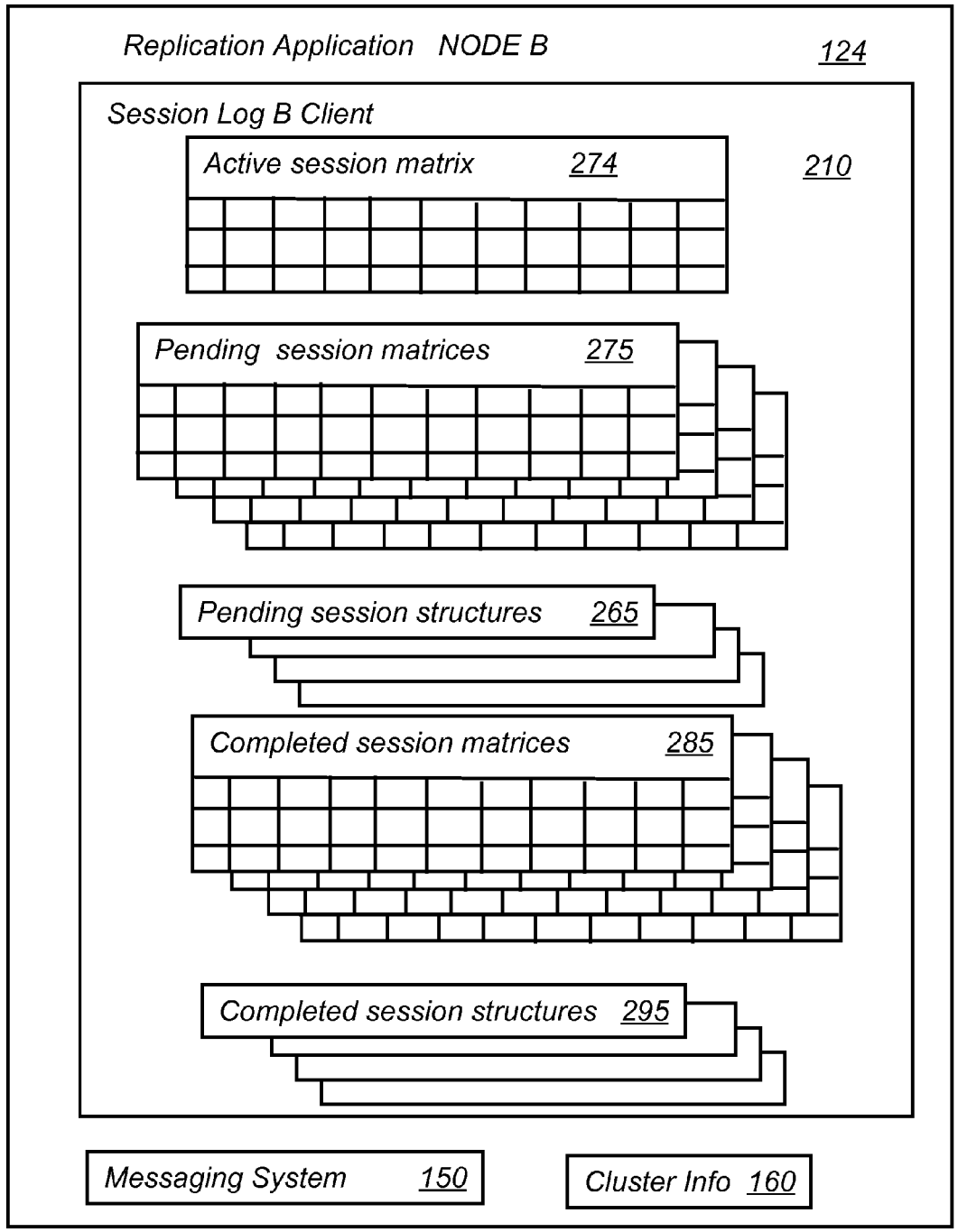
FIG. 5 is a block diagram of the session log for the client node B of FIG. 2A.

Referring to FIG. 3, replication application 114 includes a session log 200, cluster information 160 and a messaging system 150. Session log 200 for a master node maintains a set of updates that have been applied in the source. Referring to FIG. 4, session log 200 for master node A includes an active session structure 260, an active session matrix 270, a pending session matrix 273, completed session matrices 280 and completed session structures 290. Session log 210 for a client node maintains the set of "updates" that have been applied to the target. Referring to FIG. 5, session log 210 for client node B includes an active session matrix 274, pending session matrices 275, pending session structures 265, completed session matrices 285 and completed session structures 295. Active sessions are the sessions to which current updates are applied. Completed sessions are sessions that have reached a remote stable state. Pending sessions are sessions that no longer actively receive updates, but have not yet reached a remote stable state. The corresponding session matrices (active, pending and completed) display all sessions (active, pending and completed) for all cluster nodes, respectively.

Figure 6:
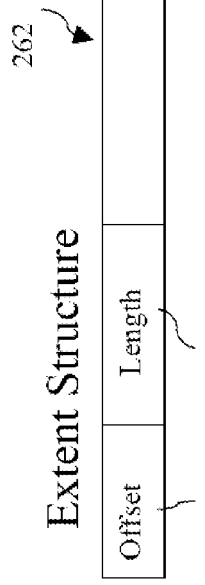
FIG. 6A depicts a block diagram of an extend structure in the session log of FIG. 4.
FIG. 6B depicts a block diagram of a session structure in the session log of FIG. 4.
FIG. 6C depicts a block diagram of a session matrix in the session log of FIG. 4.

Current "updates" are first captured in an extent structure 262, shown in FIG. 6A. Extent structure 262 includes an offset 261, a length 263 and the captured data 267. The extent is then placed in an active session 260, shown in FIG. 6B. Each active session includes session segments 264 and each session segment is assigned an index 267 and a timestamp 266. In the example of FIG. 6B, extent A is the first incoming extent and is placed in session segment index 2. The logical timestamp is changed to match the current timestamp, i.e., timestamp2. An extent may span more than one session segments. In the example of FIG. 6B, extent A spans session segment indices 2 and partially 3. All session segments for all cluster nodes are then displayed in an active session matrix 270, shown in FIG. 6C. The top row 272 of matrix 270 displays the session segment indices 1-n and the left column 271 displays the cluster nodes A-C. Fields 273 display for each cluster node (i.e., A, B, C) the timestamp for each session segment (1, 2, 3, 4 . . . n).

Cluster information 160 includes a directory 162 of all replication nodes A, B, C, D of replication cluster 100, node status information 164 and authorization and access control privileges for each node 166. Node status information 164 includes information about the status of a node including the status of the node's primary storage and log session storage. Authorization, access control privileges and authentication mechanisms for each node are also stored in the cluster information volume 166. A node may have one of three levels of authorization: read-write, read-only, and replicate-only. A node with read-write authorization has full privileges to a volume. A node with read-only authorization can create views and provide for limited rollbacks. A read-only authorization does allow a node to function as a full failover site because no host updates are allowed to be replicated. A node with a replicate-only authorization may not create any views or pseudo-views, although it can be used as a limited rollback site. In a read-only rollback site, host updates are only allowed to be applied to a pseudo-view of the data. For either a read-only or a replicate-only rollback, it is required that no host updates are actively replicated, and in a replicate-only rollback, no host updates anywhere on the network are allowed to be active.

Messaging system 150 provides bi-directional communications between nodes A, B, C, D. Messaging system 150 has a "piggybacking" process during which any message that is sent from any node to any other node includes metadata indicating the presence of available sessions to be transmitted upon request. In the absence of any other process operating within the cluster 100, a cluster "health check" message is sent periodically. A "health check" message also includes data indicating the presence of available sessions to be transmitted. In one example, master node A 114 initiates a "health check" message and selects randomly node C 134 as the recipient. Prior to sending the "health check" message to node C, the messaging system 150 at node A automatically processes node A's session matrices, looking for rows that may have changed since the last message transmission. In one example, it notices that the logical timestamp for node A's entry in session 0 matrix is greater than node C's and appends that row onto the "health check" query. It sends the query to node C and then receives a response, which may also include piggybacked metadata from node C. This unique "piggybacking" messaging mechanism is a way for distributing metadata throughout the replication cluster 100. Rather than explicitly polling or sending updates, messages are sent on an opportunistic basis from one node to another, to prevent any single process or node from overwhelming the network or the other node processors. In this case all communications and processes are entirely asynchronous.

Figure 2B:
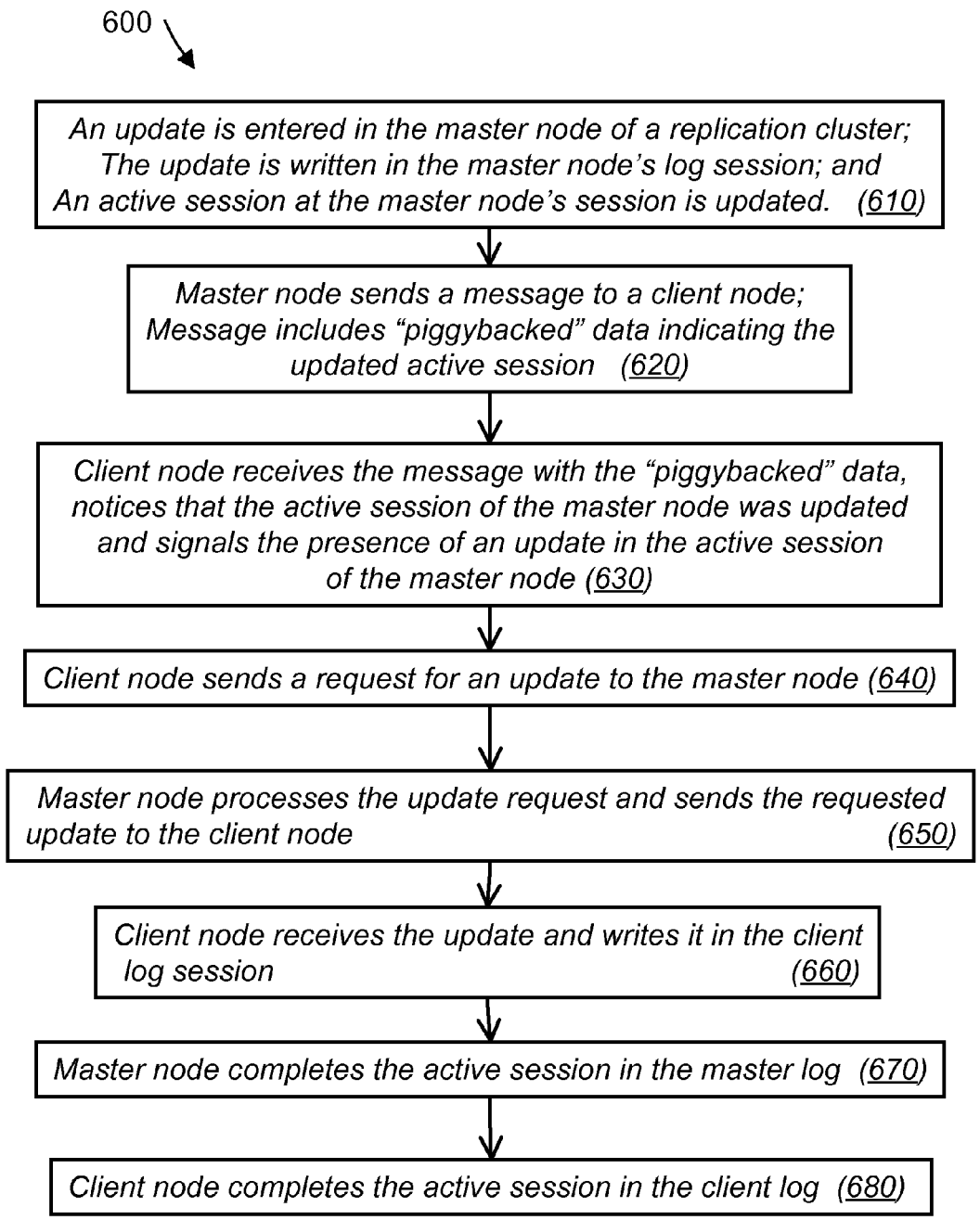
FIG. 2B is an overview block diagram of the peer-to-peer data replication method according to this invention.

Referring to FIG. 2B, the asynchronous "peer-to-peer" data replication method 600 according to this invention includes the following steps. First an update is entered in the master node of the replication cluster. The update is written in the master node's log session and an active session in the master node's log is updated (610). Next, the master node sends a message to a client node. The message includes piggybacked metadata indicating the presence of an updated active session in the master log (620). The client node receives the message with the piggybacked metadata, notices that the active session in the master node was updated and signals internally the presence of an updated active session in the master node (630). The client node sends a request for an update to the master node (640). The master node processes the update request and sends the requested update to the client node (650). The client node receives the update and writes it in the client node's log session (660). The master node completes the active session in the master log session (670) and then the client node completes the active session in the client log session (680). The process repeats itself for each new update.

Figure 7:
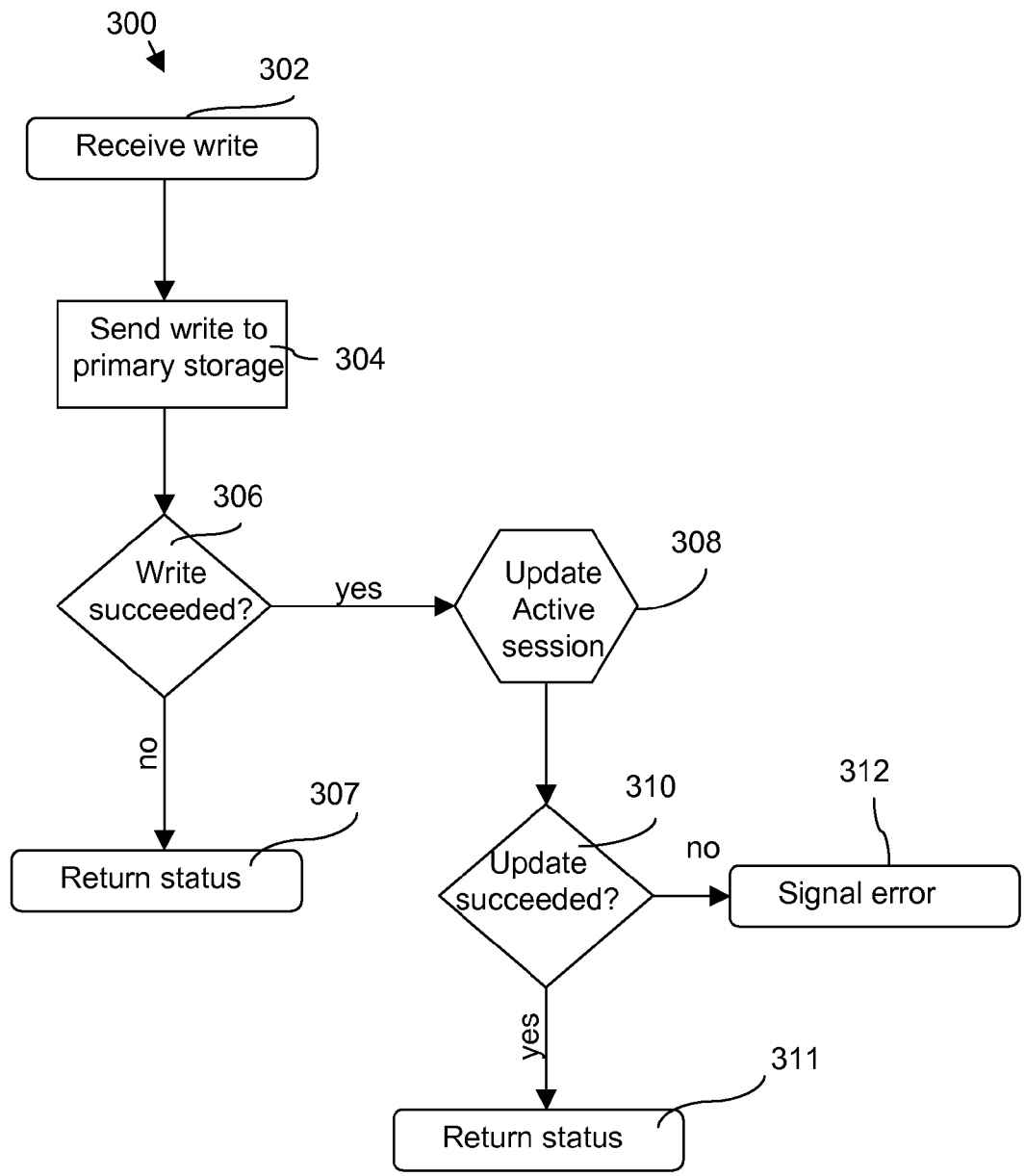
FIG. 7 is a flow diagram of the "write to log session" process for a master node.

In operation, a user at host A 112 "writes" (i.e., saves) some data in a Powerpoint™ presentation file, as an example. The host A operating system issues that "write" by encapsulating the data in a SCSI request containing both the data and their location in a data volume in the primary storage A 116. Referring to FIG. 7, the process of writing to the session log of the master node A includes the following steps. First, the host A sends the "write" request to the replication application 114 and the replication application 114 receives it (302) and sends it initially to the primary storage A 116 (304). If the "write" to the primary storage succeeds (306), the system updates the active session (308). If the update of the active session succeeds the system returns (311). If the update does not succeed the system signals an error (312). No further communication within the cluster 100 is immediately initiated, either before or after completion of the "write" task.

Figure 8:
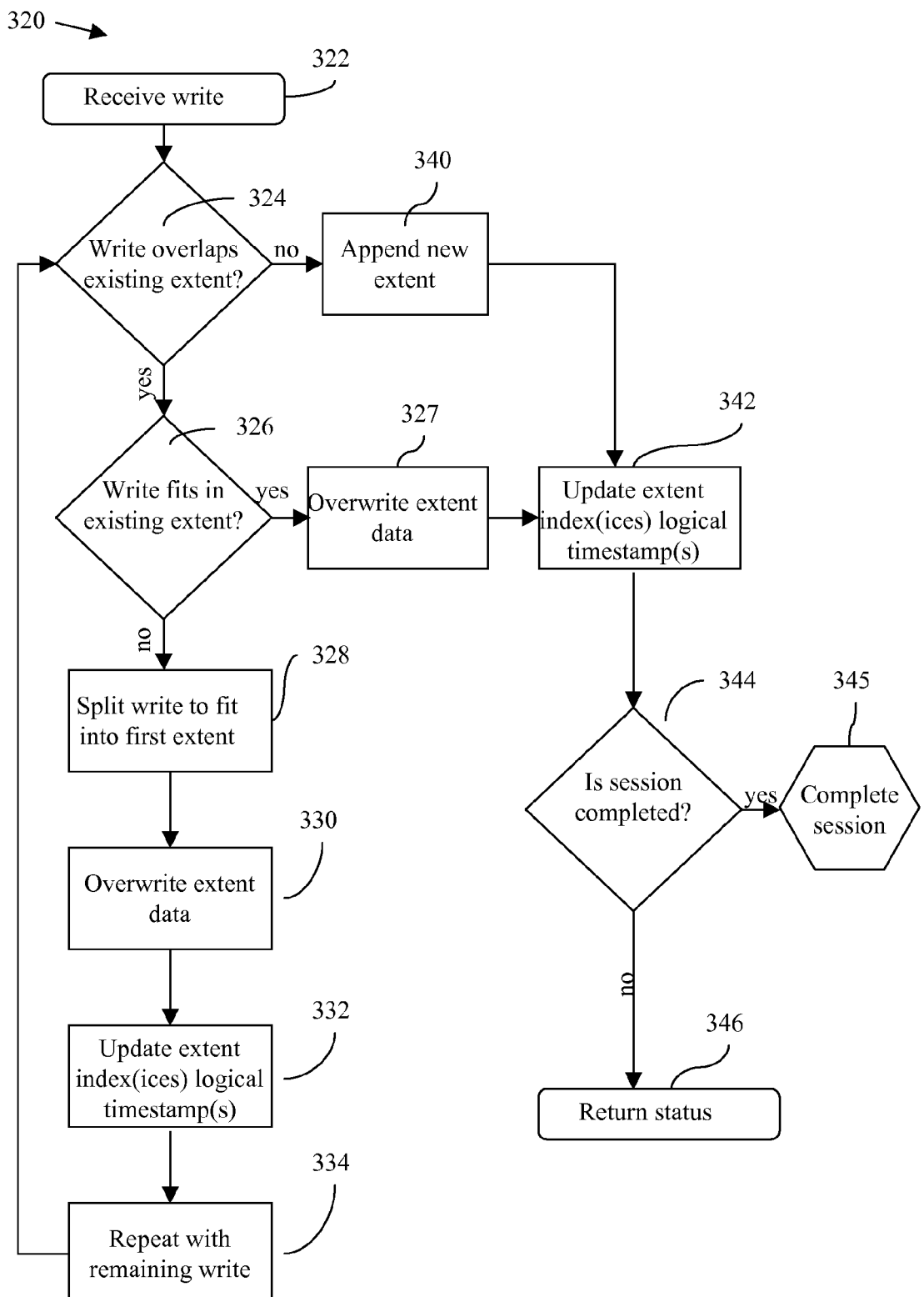
FIG. 8 is a flow diagram of the "update an active session" process.

Referring to FIG. 8, the update process 320 of the active session in the master node A includes the following steps. The replication application 114 receives the "write" request (322), formats it as a "write" extent 262 (shown in FIG. 6A) and places it in the active session structure 260 (shown in FIG. 6B). Data 267 in the "write" extent structure 262 are the data saved in the Powerpoint™ presentation file. If the "write" overlaps an existing extent (324) and the "write" fits in the existing extent (326), the extent data are overwritten (327) and the extent indices and logical timestamps in the active session structure 260 are updated (324). If the session is completed (344) the system indicates that (345) and if the session is not completed the system returns to complete the session (346). If the "write" does not fit the existing extent, it is split to fit in the first extent (328) and the first extent is overwritten (330) and its indices and logical timestamp are updated in the active session structure 260 (332). The process is repeated for the remaining "write" data (334). In the example of FIG. 6A, extent A structure is the first in the active session structure 260 and is placed at session segment index number 2. Extent A structure spans over session segment index 2 and partially over session segment index 3. The logical timestamp 266 of session segment indices 2 and 3 are changed to match the logical time.

Figure 9:
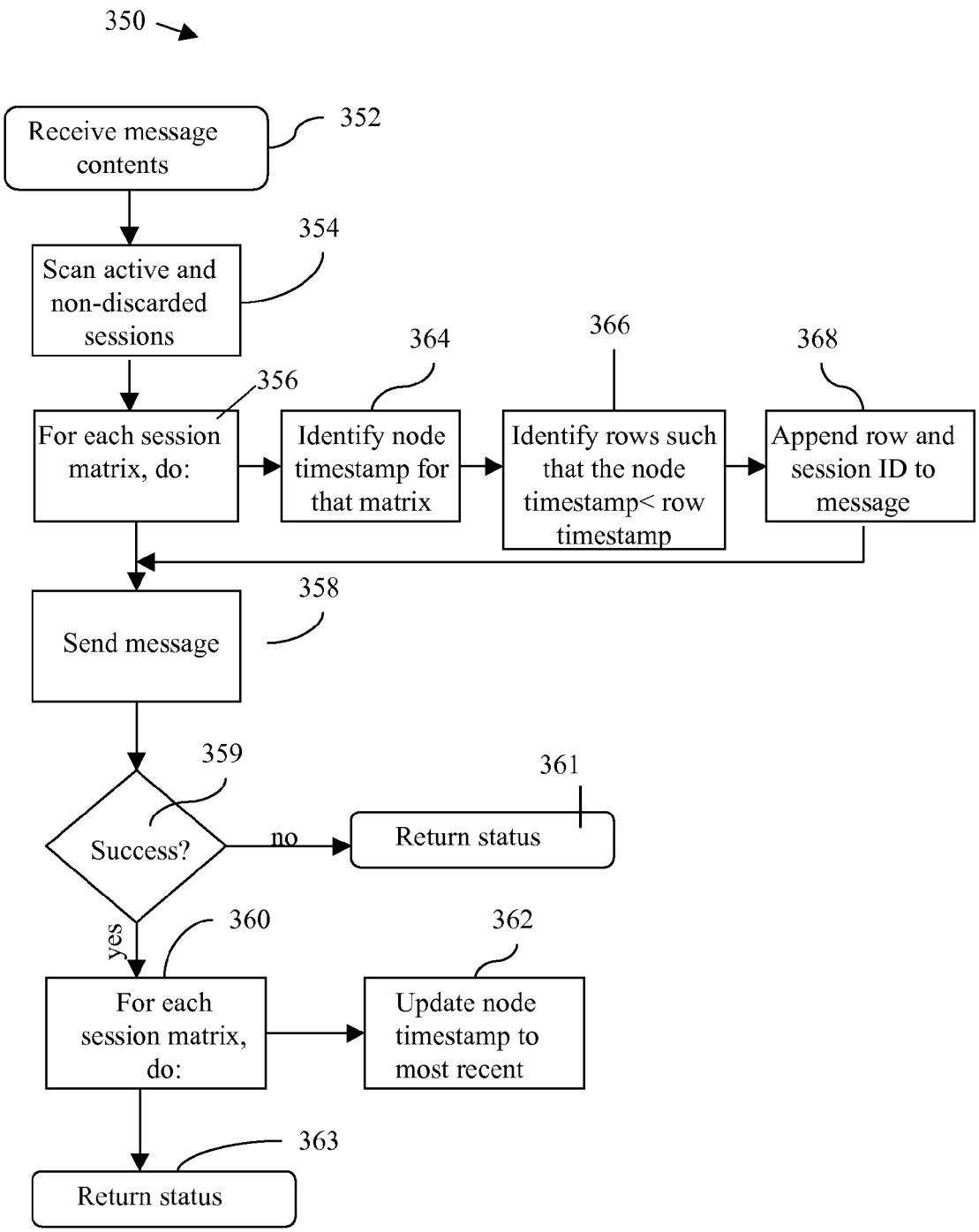
FIG. 9 is a flow diagram of the "send message to node" process.

Next, the messaging system 150 at node A sends a message to node C and the presence of the updated data is indicated in the sent message. The message may be a health check message or any other type of message. Referring to FIG. 9, the process 350 of indicating the presence of updated data in cluster node A includes the following steps. First node A formulates a message (352) and then scans active and non-discarded sessions in its log session matrix 270 (354). For each session matrix, first the node C timestamp is identified (364), then all rows with timestamp higher than the node C timestamp are identified (366) and then these identified rows and session indices (IDs) are appended to the message (368). Next the message with the appended rows and session indices are sent to node C (358) and the node C timestamp in the log session matrix 270 of node A is updated to most recent (362). If no updated session data exist in the session matrix 270 of node A that have not already been transmitted to node C, the message is sent (358) without any appended information and the timestamp of node C in session matrix 270 of node A is updated (362).

Figure 10:
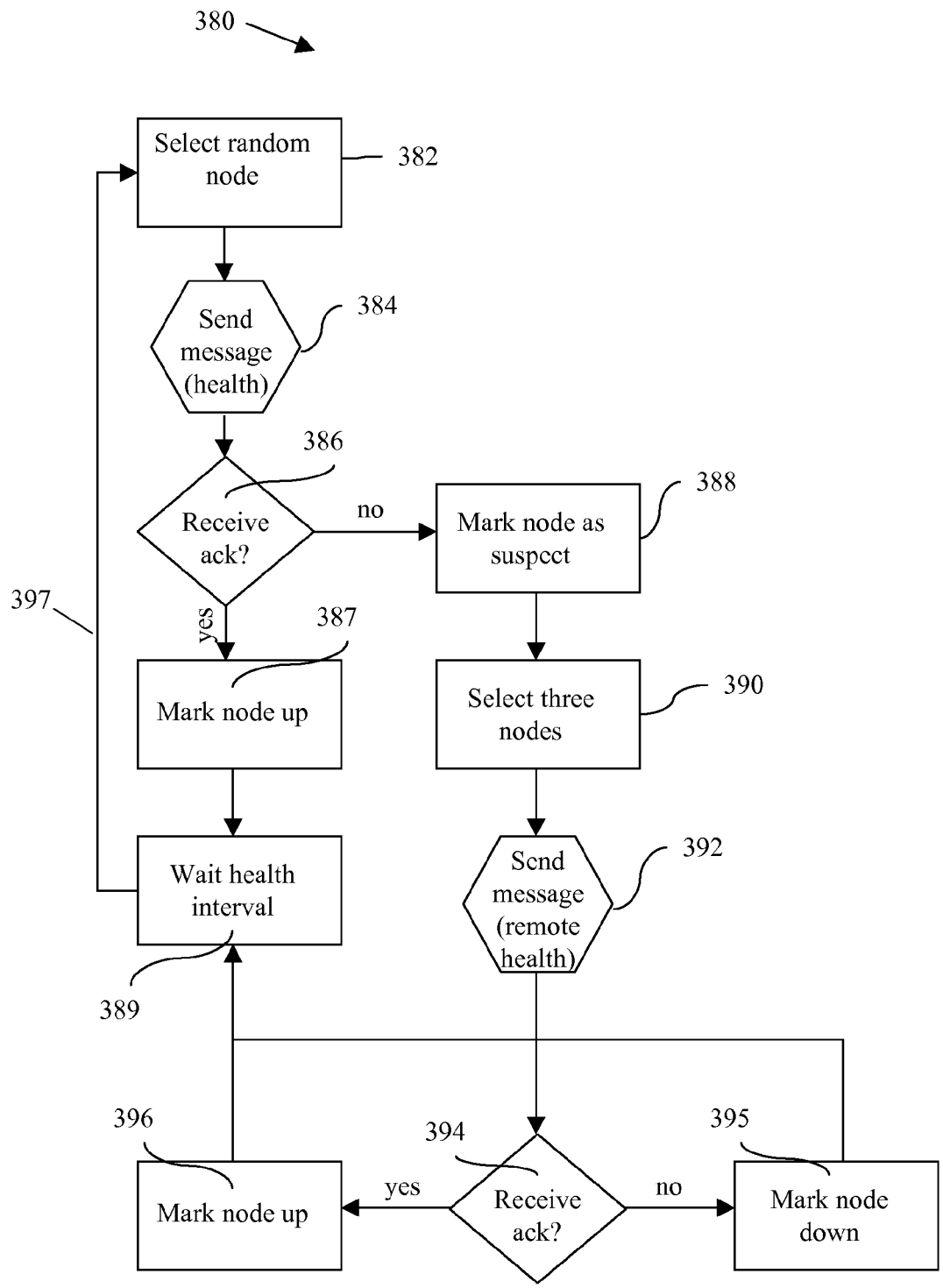
FIG. 10 is a flow diagram of the "cluster health monitor" process.

As was mentioned above, even when there are no messages to be sent or any other pending processes within the cluster 100, the system initiates a cluster health monitor process 380 that runs periodically. Referring to FIG. 10, the cluster health monitor process 380 includes the following steps. First node A selects a random node (i.e., node C) (382) and sends a health check message (384). Again, in this case, the system runs the process 350 of FIG. 9 for appending any present updates, as was described above. Node C receives the health check message and sends an acknowledgement to node A. Node A receives the acknowledgement (386) and marks node C status as being up (387). The system waits for a set time interval 389 and then repeats the process (397). If node A does not receive an acknowledgement from node C, it marks node C as suspect (388) and selects three other nodes within the cluster (390) and sends a request to them to send a health check message to node C (392). If in response to this request, node A receives an acknowledgement from either node C or any of the other three nodes about node C's status being up (394), it marks the status of node C as being up (396). If again node A does not receive an acknowledgement from either node C or any of the other three nodes about node C's status, it marks the status of node C as being down (395). In any of the above mentioned responses from node C or any other cluster nodes to node A, appended data indicating the presence of session updates in the corresponding node's session matrix may also be included.

Figure 11:
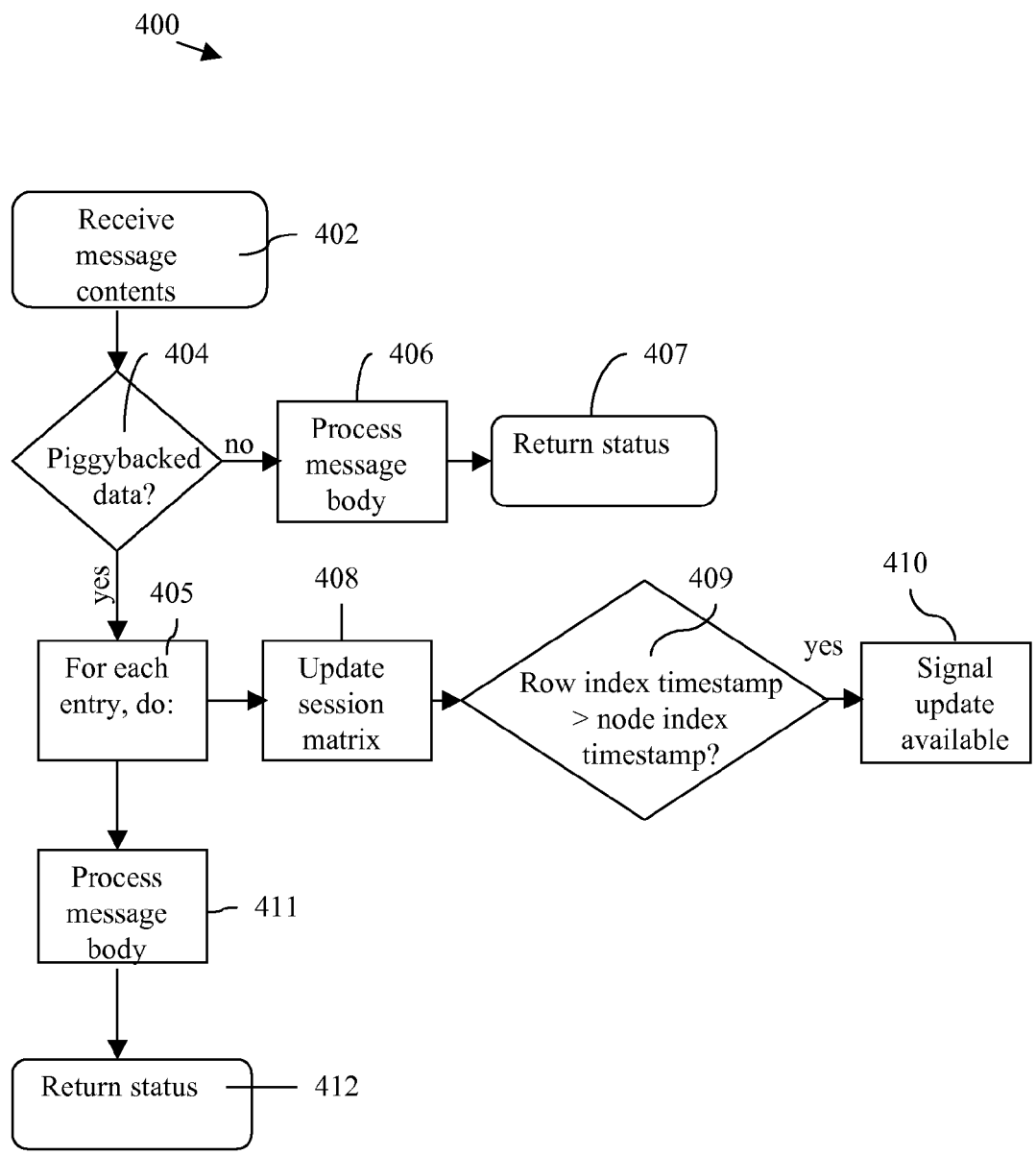
FIG. 11 is a flow diagram of the "receive message" process at a node.

Referring to FIG. 11, the process 400 of receiving a message by a node includes the following steps. First node C receives the message with the appended updates from node A (402). It checks if there are any "piggybacked" data, i.e., appended indications of session updates in the session log of node A (404). If there are no "piggybacked" data it processes the message (406) and returns a response to node A (407). If there are "piggybacked" data present, for each data entry (405) it updates its session matrix (408). In one example, the "piggybacked" data received by node C contain the node A row from the session 0 matrix. Since the updated timestamp is greater than node C's current timestamp for node A in session 0, it applies the row to the session matrix. It then compares that row to the node C row for session 0 and finds that at least one session index is more recent (409), so it signals internally that an update is available (410). For each data entry (405), node C also processes the body of the message (411) and sends a response to node A (412). The response also includes updated sessions in node C's session matrix.

Figure 12:
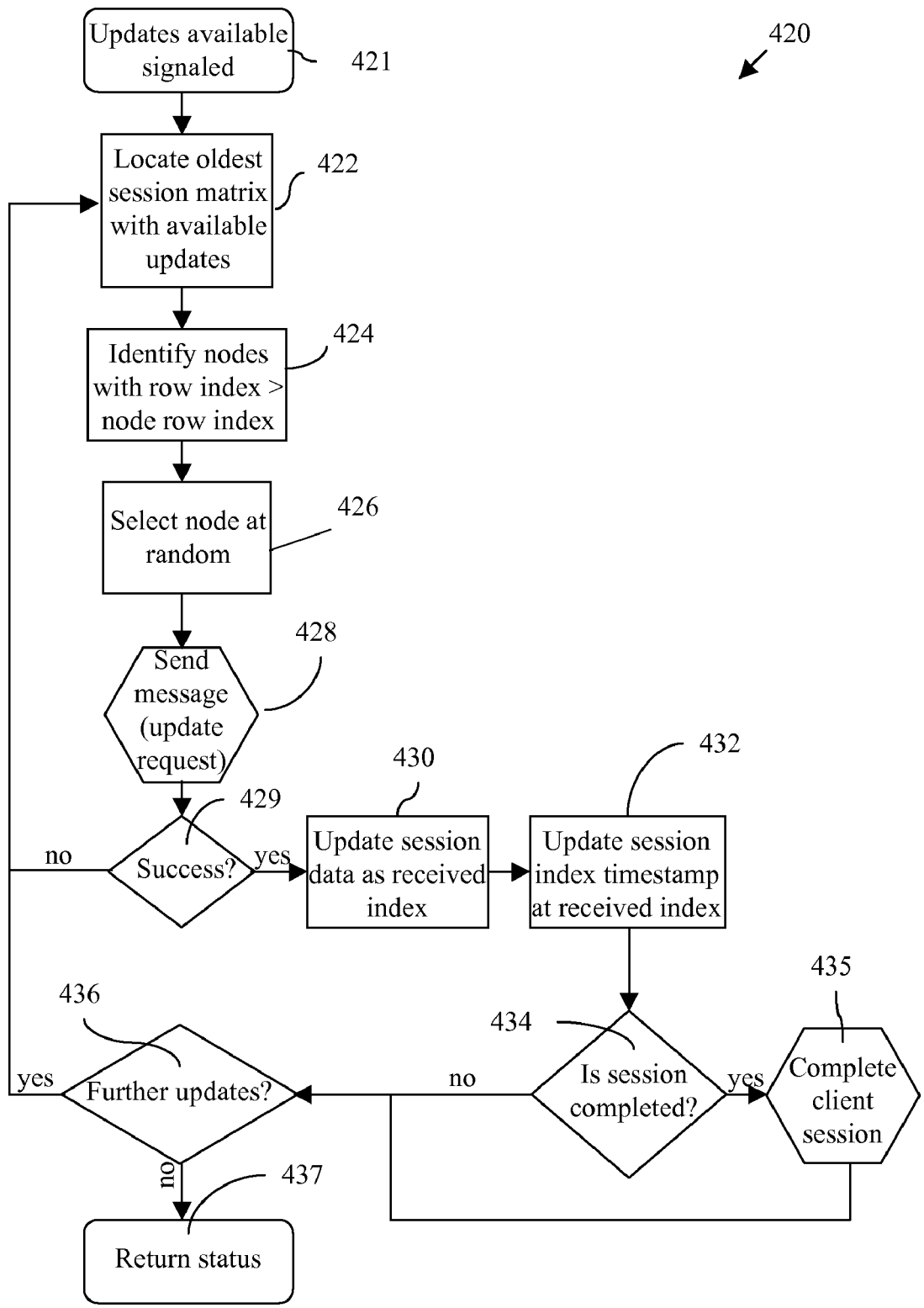
FIG. 12 is a flow diagram of the "update session" process at a client node.

Referring to FIG. 12, the process 420 of updating a session at a client node C includes the following step. Upon receiving the internal signal that an update is available (421), client node C enters the update process. The system at node C locates the oldest session matrix with available updates (422). It identifies nodes with row indices higher than the node row index (424) and selects a node at random (426) and sends a message to the selected node with an update request (428). In one example, node C searches its available session matrices (i.e., only session 0, at this point) and finds that node A has one more row index timestamps that are greater than its own (node C) row index timestamps and then node C sends an update request message to node A. Node A processes the update request as described below and in FIG. 13 and sends the updated session data to node C. Node C receives the update session data, writes the updates in the appropriate session structure (430) and updates the session's timestamp (432). If there are additional session updates (434) the process is repeated (436) until all sessions (with updated data) and their timestamps are updated in node C (435). The completion of the session update at node C is reported back to node A (437). In one example, the "write" at node A spanned four session indices 2, 3, 4 and 5. Node C runs the update request 420 four times to synchronize its session data with node A's data session.

Figure 13:
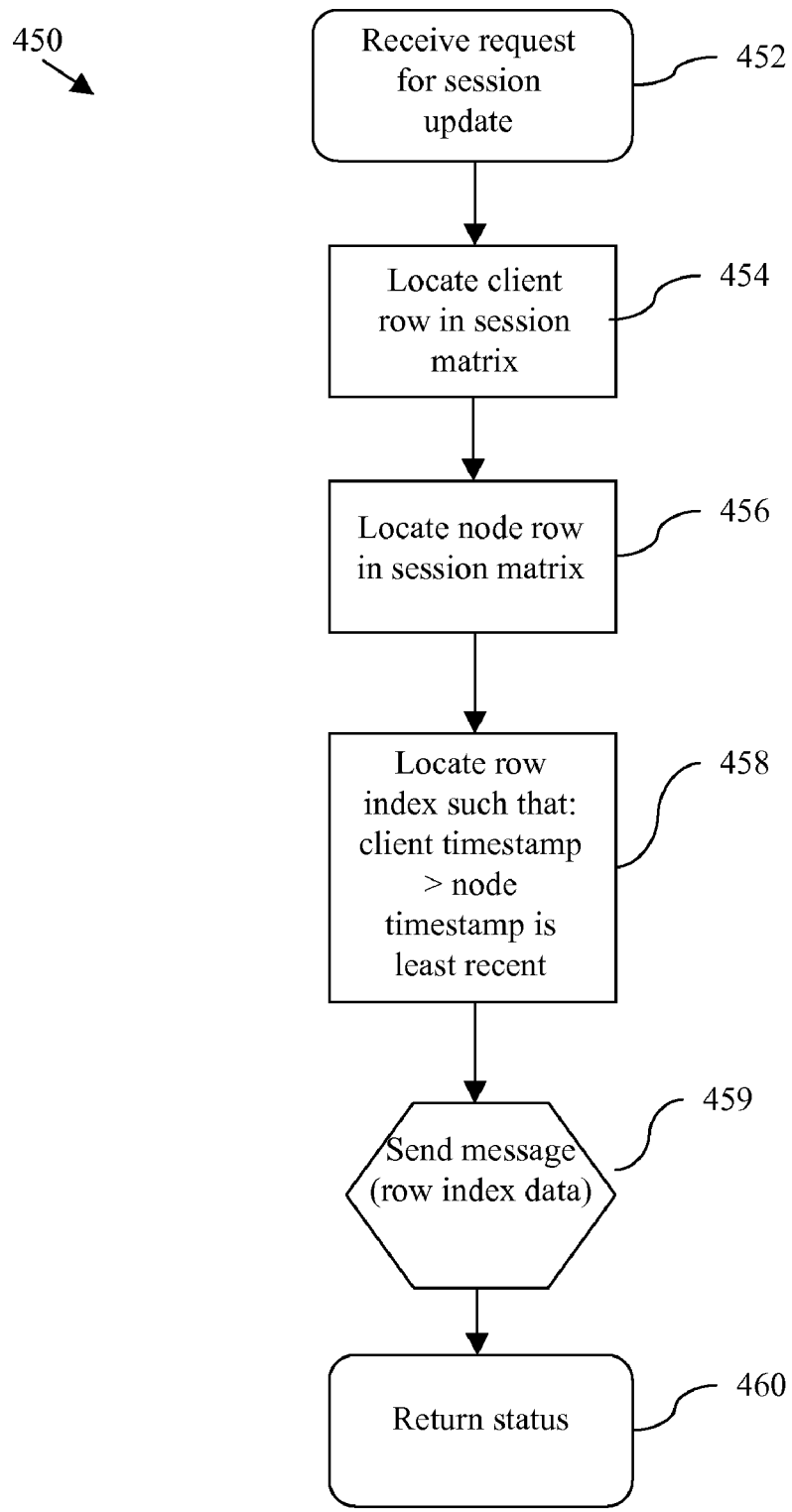
FIG. 13 is a flow diagram for processing an update request at a node.

Referring to FIG. 13, the processing (450) of an update request by a node includes the following steps. First master node A receives a request from client node C for receiving an update in session 0 (452) and then tries to determine the best chunk of session 0 to send back to node C. The system at node A locates client node C's row in its session 0 matrix (454) and its own (node A) row in session 0 matrix. Node A system compares its own row in session 0 matrix with client node C's row and finds the least recently used index that is also newer than node C's (458) and transmits it back to node C (459). In the above mentioned example of "write" at node A that spanned session indices 2, 3, 4 and 5, first the buffer segment at index 2 is selected to be transmitted to node C.

As was mentioned above during normal operation node C's health monitor process is triggered periodically. In one such case, node C sends a health check message to node B that now includes the updates in session 0 both in row for node A and row for node C. Node B receives this message from node C and updates its own session matrix to reflect these changes. Node B compares its own row in the session 0 matrix to the rows of node A and node C and notices that updates are available. In this case, since both node C and node A have synchronized and updated session 0, node B has the option to pick either node A or node C to send an update request. Assuming node B sends a first update request to node C and receives in return buffer index 2 from node C. If we further assume that node C has not yet completed its update of buffer indices 3, 4 and 5, node B in the next update cycle examines the rows again and finds that node A is the only node that has the remaining updates in indices 3, 4 and 5 and sends the update request for buffer indices 3, 4 and 5 to node A. In the meantime, node D sends a health check message to node A and receives the updates to both node A's and node C's rows in the session 0 matrix.

Figure 14:
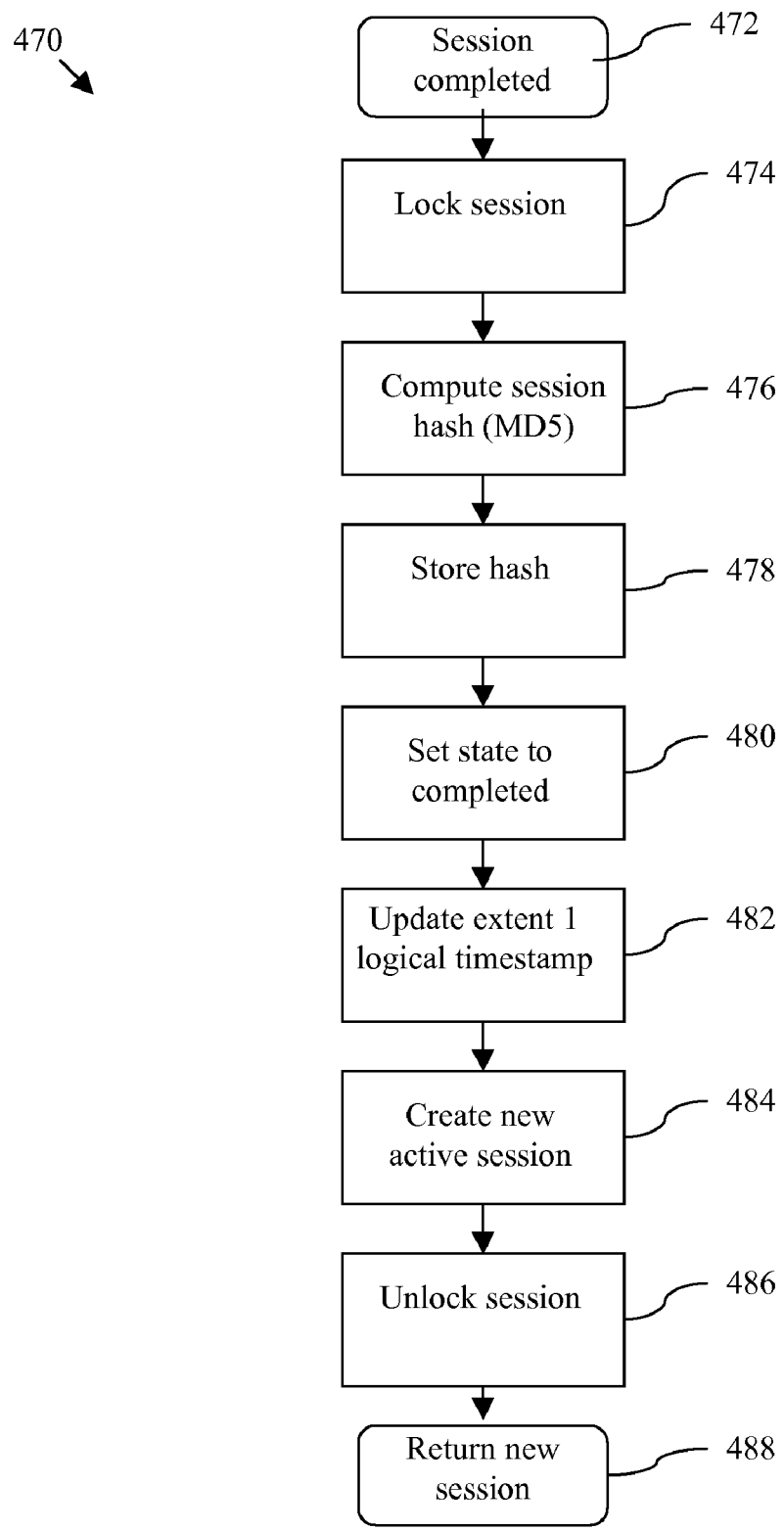
FIG. 14 is a flow diagram for completing an active session at a master node.
Figure 15:
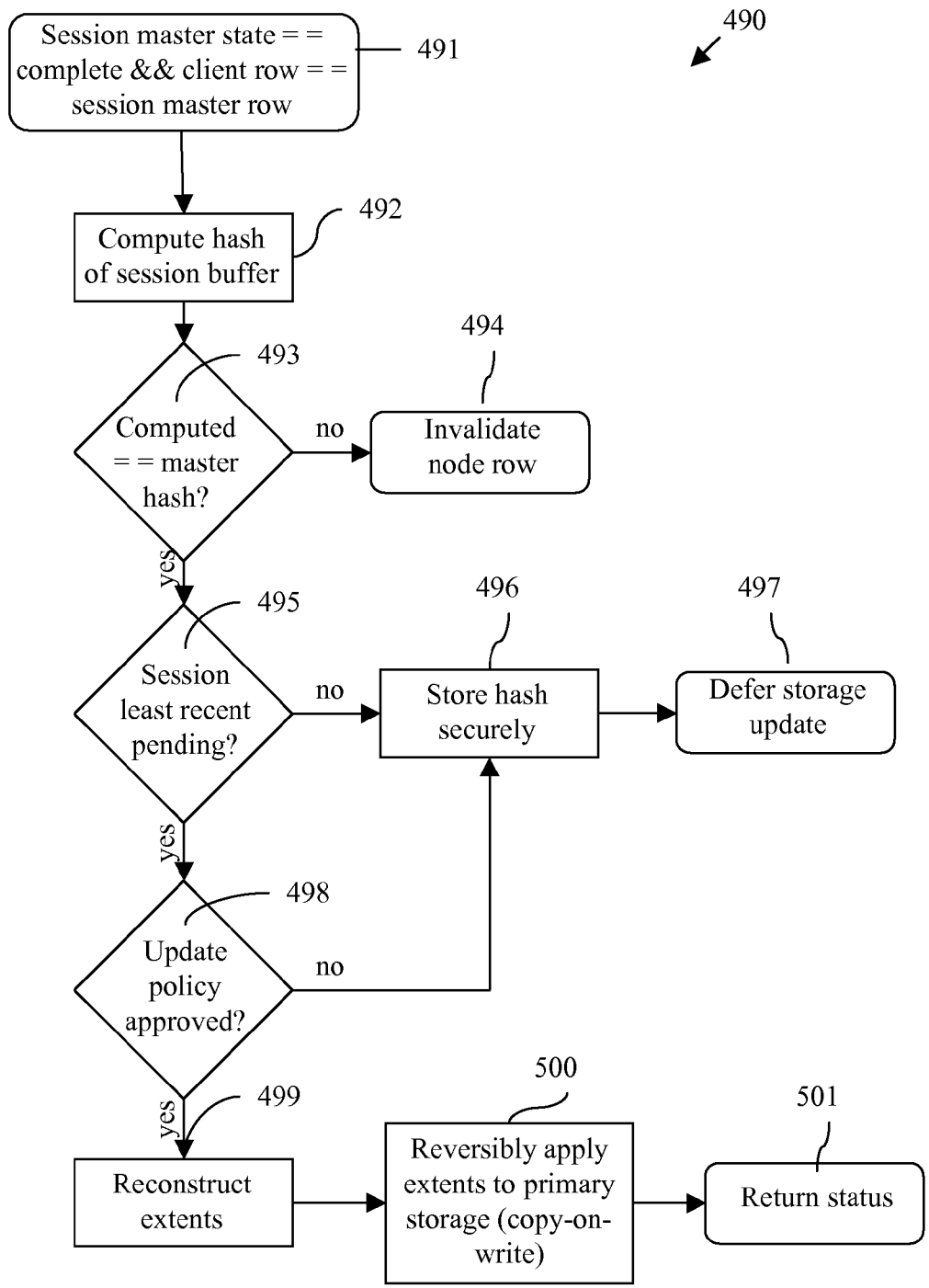
FIG. 15 is a flow diagram for completing an active session at a client node.

An active session in any node may be completed at any point for a variety of reasons. Referring to FIG. 14, the process of completing an active session 470 in a master node includes the following steps. First active session 0 in master node A is completed (472) and locked (474). Next, the session's hash is computed (476) and stored (478). Next the session's state is set to complete (480) and the extent session 1 logical timestamp is updated (482). Next, a new active session is created (484), the new session is unlocked (486) and the new session is returned (488). Next, client node C issues an update request to master node A and receives data from session 0 buffer index 1. Node C notices that the state of the session was changed to "completed" and compares its own session 0 row to node A's session 0 row. If the two rows are identical, node C has the option to complete its own session 0. Before proceeding with the completion of its own session 0 node C verifies the correctness of its session data. Referring to FIG. 15, the process 490 of completing an active session at a client node C includes the following steps. First client node C notices that the session 0 state in the master node A is completed and its own session 0 row is identical to master node A's session 0 row (491). Next, client node C computes its hash of session 0 buffer (492) and compares it to the computed hash of the master node. If the computed client session hash is the same as the master session hash (493) and the least recent session is not pending (495), the client hash is stored securely (496) and the storage update is deferred (497). If the computed client session hash is the same as the master session hash (493) and the least recent session is pending (495), the system checks if the update policy is approved. If the update policy is not approved, the client hash is stored securely (496) and the storage update is deferred (497). If the update policy is approved the extents are reconstructed (499) and the extents are then applied reversibly to the primary storage of client node C (copy-on-write) (500). At this point, if no other "writes" have been performed by host A, the data volume in the primary storage 116 of master node A is identical to the data volume in the primary storage 136 of client node C. The session structure is not discarded until after nodes B and C have completed their updates.

In the embodiment of FIG. 2A cluster node A was initially designated as the master node and nodes B, C and D as the client nodes. These roles may be changed at another time, provided this crossover is not disruptive to business processes. In one example, the same user owns both host A and host B and moves from location A to location B and then designates node B as the master and nodes A, C, and D as the clients. The session master is moved to node B and node B creates a new session after discarding any empty active sessions. Before new reads or writes are accepted in the new session at node B, the data volumes in primary storage 126 of node B must be brought up-to-date. In one example, the updating process of the data volumes in storage 126 includes retrieving index 3 from node A, index 1 from node C, index 5 from node D and index 4 from node A. These data updates complete the session in node B and synchronize the data volumes in storage 126 with the rest of the cluster nodes.

Within a cluster node there are three levels of synchronization that can be performed. They include synchronization at the data volume level, synchronization at the session data level and synchronization at the metadata level. In an active replication cluster system there are no guarantees that any of these levels are perfectly synchronized across the cluster nodes. However, in an idle cluster system (i.e., a system that stops receiving updates from attached hosts) all these levels will eventually stabilize upon a common set of values.

The interface of the session log indicates if a specific update has been successfully applied in the log or if a failure has occurred. Furthermore, a warning value is returned in cases where there are reliability or other performance problems with the log. This is the case when the log is close to being filled or the rate at which the log is being filled is significantly faster than it is being remotely replicated, or no remote replication targets are currently active. In other embodiments, the log configures itself adaptively to such conditions, adjusting its performance characteristics to throttle incoming updates and prevent resource exhaustion. Since the updates are applied to the log synchronously, throttling the log slows the performance of the host, which may or may not be acceptable.

In addition to updates, logs receive checkpoint conditions to indicate significant points in the input/output (IO) stream. These checkpoints are provided by data sources to ensure that a particular set of updates to a remote site are applied atomically and to prevent data corruption due to application incoherency. Checkpoints may be asynchronous or synchronous: an asynchronous checkpoint is simply recorded by the logging system and returned immediately, while a synchronous checkpoint does not return until the logging system has reached a state in which the current log structure can be discarded. All checkpoints are assigned a unique identifier, and certain variations may allow the conversion of an asynchronous checkpoint to a synchronous checkpoint, or allow, for example by means of a timeout, the conversion of a synchronous checkpoint to asynchronous.

Certain replication target updates are also transmitted to the source log. A target log status update transmits information about unexpected changes in a target log, e.g. the failure of the target's persistent log storage device. A target volume status update transmits information about unexpected changes in a target volume's status, e.g. the failure or replacement of a target volume's persistent storage device. In response to such status updates, the source log adjusts its own state and behavior accordingly, and may propagate state changes to the rest of the system.

The initialization of a source volume into the replication protocol of FIG. 2A can occur either before or after data are placed into that volume. If there are no data on the volume (i.e., the volume is blank), the source log system can simply create the necessary data structures and proceed with steady-state replication procedures. If data already exist in the volume, then the source log system provides a mechanism for the replication of the entire source volume to the remote targets of the replication cluster 100.

When adding a remote target node to the replication system 100, the target node and the source node must reach an agreement on their mutual state. If all of the data that are currently resident on the source volume are also present in active and pending sessions (i.e., session-resident data) on the source log system, a target log system may simply join in the replication protocol. This case typically occurs only if the remote target is added before or shortly after a blank source volume is initialized.

If the source volume contains data that are not session-resident, the system must create an establishment session. An establishment session is a compact representation of the entire volume indicating which sections of that volume have been stored on the remote target. The remote target system treats replication of the establishment session in a very similar way to regular pending sessions, i.e., by sending update requests to the source node, receiving the updates and storing the updates. However, in establishment sessions the updates are stored immediately into a target volume.

A node that has a currently active establishment session may also participate in the normal pending and active session replication. However, as the node completes the pending sessions, the impact of the completed pending session should also be recorded into the established session, regardless of whether or not the session is applied. Blocks that reside in completed sessions stored on a target node do not need to be retrieved from the other nodes. One implication of this approach is that until all completed pending sessions are applied, an establishment session cannot be completed, since the data on the target volume structure will be incomplete. Cluster nodes that have incomplete establishment sessions cannot be considered to have full, correct replicas and they cannot be used for any point-in-time options.

If a node experiences a full or partial data loss, e.g. due to a disk or other hardware failure, it can be treated as if it is initializing, although it may be possible to recover some of the data from pending sessions, if they are still available. If a node experiences a temporary outage, with no data loss, it must evaluate the state of the replication system. It will compare its most recent pending and active sessions with the pending and active sessions of the current state. If sufficient session data exist in the network, the node will simply update its state and rejoin normal steady-state replication, although it still runs the risk of falling too far behind. If it determines that it cannot recover enough data from the sessions that are currently available in the network, it must create an establishment session.

In cases where a target node fails, the source log system notices the failure and may create an establishment session for the failed node. In particular, before discarding any pending session, the source will fold that pending session into the target node's establishment session. Upon recovery, the target node may issue an extended log update request to retrieve the stored establishment session. This process reduces the amount of data that must be transmitted. One variation allows for the source log system to maintain establishment sessions for all target nodes, tracking the differences between the most recent pending session and the last pending session, which the target acknowledged as having been applied. Establishment sessions essentially compactly track the differences between two points in time for a specific node. As such, they are valuable assets in failover and rollback disaster recovery implementation.

Failover causes significant changes in the configuration of the replication system. In cases of a source failover, the system designates a new cluster node as the source. The old source assumes a more regular replication role. The state of the replication system is therefore established as the point in time of the most recent active-to-pending session transition. Rollback is a more robust form of failover. Therefore, in cases of a source rollback, designating another cluster node with a specified point in time as the new source requires that all other cluster nodes restore themselves to that point in time.

A cluster node, which is designated as the new source volume, whether due to failover or rollback, must have a full volume replica of the appropriate point in time. All pending sessions prior to that point must be completed and applied. Upon the designation of a new cluster node as the source volume, the new source node will create an establishment session containing all completed pending sessions between the new point in time and the previous. Any other cluster node that had not yet completed or applied pending sessions after the new point in time can proceed by simply deleting the invalidated sessions. If cluster node has applied invalidated sessions, it must create an establishment session with the new source node, retrieving and merging the appropriate data. If the node is the previous source node, it will always need to create an establishment session and include the data from its last active session. A failover or a rollback always results in the current active session transitioning to pending, and the pending session being invalidated. The one exception to this rule occurs in a clean failover, in which host updates to the source are suspended, the active session is transitioned to pending, and the pending session is transferred to the new source. In this case, when the active session is null, the establishment session is also null, and the previous source can immediately resume normal replications.

A mechanism is also provided for bulk target initializations, in which a copy of a source volume or set of volumes is made and physically transported to a target site. In this case, the physical copy is created by suspending host updates to the source volume, creating a physical copy and tagging it with a session ID, and creating an establishment session associated with that session ID. Upon receipt of the physical media at the target site, the target data are loaded and a normal establishment session is created by querying the source logging system with the stored session ID. Replication proceeds as described above.

The preferred method for accessing data at a target site is by utilizing a full replica of the source volume(s) at a specific point in time. This replica is known as a view. Multiple views of a source volume may be created at any cluster site including all target sites and the source site. Any view within the replication cluster may function as a source for the replication process, with the caveat that information about its origin as a replica is not propagated. Views can be updated to be brought into synchronization with a more recent copy of the source volume data. Views may also be detangled from the cluster and may be designated as standalone volumes with no further relationship with the original source data. Hosts may be granted full read/write access to a view, although use of the view update functionality generally requires coordination with the host management. Any local host updates are lost during the view update process.

The initial creation of a view involves the creation of a local establishment session, which is used to track the amount and location of data that is to be copied from the originals. During the initial establishment of a view, the original cluster sites may proceed with the normal replication operations. Any updates that take place during this time will also be applied to the local establishment session. In case there are holes left in the local session log, a second establishment session takes place and the updates to the original cluster volumes are suspended for the duration of the second establishment session. After the second establishment session, the original cluster volumes may resume normal operation, and the view is considered established. However, the local establishment session is not discarded; instead it is used to track both updates to the view from the host and updates to the original cluster volumes during session application. At any point that a view update is desired, the originals may be suspended and the local establishment session reapplied. This operation will result in all previous host updates being discarded, and all session updates being applied, bringing the view up to the desired point in time.

This initialization procedure is designed for minimal interference with the normal replication operations. It therefore lacks the ability to specify at initialization the precise point in time for the view. Instead, the view will represent the point in time at which the first establishment phase completes. Future updates can be synchronized with a specific replication session. If this requirement is not sufficient, session application on the original cluster volumes can be suspended for the entire duration of the first establishment phase, resulting in a complete copy at precisely the point in time of suspension. Of course, during the suspension, the target site will continue to participate in the replication operations (without applying sessions), but it does run the risk of lagging too far behind the rest of the network and requiring its own establishment session to catch up.

A more space-efficient but potentially more disruptive option for target site access is termed a pseudo-view. A pseudo-view is created simply by suspending session application. Again, normal replication protocol operations are still observed, so session updates are still processed, but no session can be applied, and consequently, no session can be discarded. If the access requirements for a pseudo-view are read-only, as in the establishment of regular views, above, then no additional steps are required. Hosts can access the pseudo-view at will, for example, for the purposes of a backup to tape. If a writable pseudo-view is created, a local active session is created for that pseudo-view. Updates from the host are sent to the active session, and the read process is correspondingly more difficult. In one variation, updates are kept in a buffer cache, and reads occur from both that cache and the original cluster volumes. In another variation, the log structure is designed to support rapid reconstruction of reads from multiple written sources. In some variations, a pseudo-view can be upgraded to a full view.

In addition to source (master) nodes and target (client) nodes, a cluster may have midpoint nodes. Midpoints are nodes that do not maintain full volume replicas of the cluster's primary storages. Therefore, they do not need as much storage capacity as full target nodes. They only keep a set of sessions retrieved from the source. Midpoints are useful because they provide an inexpensive way to quickly increase redundancy for recent updates, and decrease the expected load on the source network. By increasing the number of nodes that can be selected for sending update requests, the probability that a request is sent to the source is decreased. Although the source network always transmit at least one copy of the updated data to a target within the network, having more nodes in the network decreases the probability that multiple requests for the same data will be sent to the source. Source nodes may exchange roles with the target nodes in cases of a failure at the source node or any other reason. However, this exchange cannot happen with a midpoint node, because the midpoint node lacks a full volume replica of the source's primary storage. Furthermore, midpoints never create establishment sessions, as they do not maintain full replicas. They can effectively entangle and detangle themselves from the cluster at will.

The log system also tracks sufficient information to describe a reasonable window of its history, including statistics on the number of updates that have occurred in each session, the size of the updates that have occurred during the session, the number of pending and establishment sessions, the number and locations of buffers transmitted for each session, the rate at which pending sessions are discarded, and any host throttling parameters that are currently applied.

Several embodiments of the present invention have been described. Nevertheless, it will be understood that various modifications may be made without departing from the spirit and scope of the invention. Accordingly, other embodiments are within the scope of the following claims.

What is claimed is:

1. An asynchronous data replication method comprising:
providing a replication cluster comprising at least one master node and at least a first client node, wherein said master node comprises a master log and said first client node comprises a first client log;
entering an update in a data volume of said master node and storing said update in a master node storage;
updating a first active session in said master log;
sending a first message from said master node to said first client node wherein said first message comprises a first message content and first "piggybacked" metadata indicating that said first active session in said master log was updated and is available to be transmitted upon request;

receiving said first message by said first client node, and upon reading said metadata, registering that said first active session in said master log was updated and signaling internally that said first active session in said master log was updated;

sending an update request from said first client node to said master node;

processing said update request by said master node and sending the update to said first client node; and receiving the update by said first client node and updating said first active session in said first client log;

wherein said first active session comprises one or more segments and said master log comprises a master active session matrix storing all session segments for all cluster nodes and said first client log comprises a first client active session matrix storing all session segments for all cluster nodes.

2. The method of claim 1 wherein each of said session segments comprises an index and a timestamp and wherein said session matrices display all said session segment's indices and timestamps for all cluster nodes.

3. The method of claim 2 wherein said updating of said first active session comprises writing data in an extent structure and entering said extent structure into said first active session.

4. The method of claim 3 wherein said extent structure comprises a length larger than a session segment's length and wherein said extent structure is entered into more than one session segments.

5. The method of claim 4 wherein said processing of said update request by said master node comprises locating in said master active session matrix all session segments that have not yet been transmitted to said first client node log and sending said identified session segments to said first client node.

6. The method of claim 5 wherein said session segments that have not yet been transmitted to said first client node log are identified as session segments registered in a row of said master active session matrix corresponding to said first client node having a timestamp earlier than the timestamp of a most recently updated session segment in a row of said master active session matrix corresponding to said master node.

7. The method of claim 6 wherein said replication cluster comprises a second client node and wherein said second client node comprises a second client log and wherein said second client log comprises a second client active session matrix storing all session segments for all cluster nodes.

8. The method of claim 7 wherein said method further comprises sending a second message from said first client node to said second client node and wherein said second message comprises a second message content and second "piggybacked" metadata indicating that said first active session was updated and is available to be transmitted upon request.

9. The method of claim 8 further comprising:

receiving said second message by said second client node, and upon reading said second metadata registering that said first active session in said master log and said first client log was updated and signaling internally that said first active session was updated;

sending an update request from said second client node to said first client node;

processing said update request by said first client node and sending the update to said second client node; and receiving the update by said second client node and updating said first active session in said second client log.

10. The method of claim 9 wherein any of said messages comprises one of a "health check" message sent periodically from said master node to any of said client nodes, a "health check" message sent periodically from any of said client nodes to said master node, a "health check" message sent periodically from any of said client nodes to other client nodes within the replication cluster.

11. The method of claim 1 further comprising completing said first active session in said master log.

12. The method of claim 11 further comprising completing said first active session in said first client log.

13. The method of claim 12 wherein said master log further comprises an authorization and access control protocol for each cluster node.

14. The method of claim 13 wherein said access control protocol comprise one of read-write, read-only, and replicate-only.

15. A data replication system for performing peer-to-peer data replication within a replication cluster comprising at least one master node and at least a first client node, wherein said master node comprises a computing device, a primary storage and a session storage and wherein said computing device comprises a data replication application configured to enter an update in a data volume of said master node and store said update in said master node primary storage, update a first active session in a master log stored in said session storage, send a first message from said master node to said first client node wherein said first message comprises a first message content and first "piggybacked" metadata indicating that said first active session in said master log was updated and is available to be transmitted upon request, and upon receipt of an update request from said first client node process the update request and send the requested update to the client node, wherein said first active session comprises one or more segments and said master log comprises a master active session matrix storing all session segments for all cluster nodes and said first client log comprises a first client active session matrix storing all session segments for all cluster nodes.

16. The data replication system of claim 15 wherein said first client node comprises a computing device, a primary storage and a session storage and wherein said computing device comprises a data replication application configured to receive said first message by said master node, register that said first active session in said master log was updated and signal internally in said client node that said first active session in said master log was updated, send an update request to said master node, receive the update from said master node and update said a first active session in a first client log stored in said session storage.

17. The data replication system of claim 15 each of said session segments comprises an index and a timestamp and wherein said session matrices display all said session segment's indices and timestamps for all cluster nodes.

18. The data replication system of claim 17 wherein said updating of said first active session comprises writing data in an extent structure and entering said extent structure into said first active session.

19. The data replication system of claim 18 wherein said extent structure comprises a length larger than a session segment's length and wherein said extent structure is entered into more than one session segments.

20. The data replication system of claim 19 wherein said processing of said update request by said master node comprises locating in said master active session matrix all session segments that have not yet been transmitted to said first client node log and sending said identified session segments to said first client node.

21. The data replication system of claim 20 wherein said session segments that have not yet been transmitted to said first client node log are identified as session segments registered in a row of said master active session matrix corresponding to said first client node having a timestamp earlier than the timestamp of a most recently updated session segment in a row of said master active session matrix corresponding to said master node.

22. The data replication system of claim 21 wherein said replication cluster comprises a second client node and wherein said second client node comprises a computing device, a primary storage and a session storage and wherein said computing device comprises a data replication application configured to receive a second message from said first client node, wherein said second message comprises a second message content and second "piggybacked" metadata indicating that said first active session was updated and is available to be transmitted upon request, register that said first active session in said master log and said first client log was updated and signal internally that said first active session was updated, send an update request to said first client node, receive the update and update said first active session in a second client log.

23. The data replication system of claim 22 wherein any of said messages comprise one of a "health check" message sent periodically from said master node to any of said client nodes, a "health check" message sent periodically from any of said client nodes to said master node, a "health check" message sent periodically from any of said client nodes to other client nodes within the replication cluster.

24. The data replication system of claim 23 wherein said master log further comprises an authorization and access control protocol for each cluster node.

25. The data replication system of claim 24 wherein said access control protocol comprise one of read-write, read-only, and replicate-only.

* * * * *